(12) United States Patent
Moran

(10) Patent No.: US 6,764,622 B2
(45) Date of Patent: Jul. 20, 2004

(54) METHOD OF ASSEMBLING A CONTAINER WITH EXPANDING FOAM

(75) Inventor: Jorge E. Moran, Nashville, TN (US)

(73) Assignee: Megatrade International, Inc., Nashville, TN (US)

(*) Notice: Subject to any disclaimer, the term of this patent is extended or adjusted under 35 U.S.C. 154(b) by 208 days.

(21) Appl. No.: 10/097,604

(22) Filed: Mar. 15, 2002

(65) Prior Publication Data
US 2004/0080069 A1 Apr. 29, 2004

Related U.S. Application Data

(62) Division of application No. 09/758,227, filed on Jan. 12, 2001, now Pat. No. 6,530,496.

(51) Int. Cl.[7] .......................... B29C 44/06; B29C 44/12
(52) U.S. Cl. .................. 264/46.5; 29/450; 264/46.6; 264/46.7; 264/46.9
(58) Field of Search ................. 29/450; 264/46.7, 264/46.5, 46.6, 46.9

(56) References Cited

U.S. PATENT DOCUMENTS

| | | | |
|---|---|---|---|
| 1,517,978 A | | 12/1924 | Giese |
| 2,147,263 A | | 2/1939 | Mills |
| 2,186,338 A | | 1/1940 | Mills |
| 2,632,319 A | | 3/1953 | Adrian |
| 3,057,508 A | | 10/1962 | Kimbrough, Jr. |
| 3,666,162 A | * | 5/1972 | Tiffin et al. .................. 229/400 |
| 4,026,274 A | | 5/1977 | Gutierrez |
| 4,103,411 A | * | 8/1978 | Gottsegen ..................... 29/416 |
| 4,184,601 A | | 1/1980 | Stewart et al. |
| 4,305,772 A | * | 12/1981 | Valyi ........................... 156/287 |
| 4,388,996 A | | 6/1983 | Panicci |
| 4,415,387 A | * | 11/1983 | Newman ...................... 156/69 |
| 4,625,884 A | | 12/1986 | Zimmermann |
| 4,676,411 A | | 6/1987 | Simasaki |
| 4,768,664 A | | 9/1988 | Zimmermann |
| 5,257,509 A | * | 11/1993 | Harris .......................... 62/326 |
| 5,299,705 A | | 4/1994 | Dettmar |
| 5,417,336 A | | 5/1995 | Cortez |
| 5,515,995 A | * | 5/1996 | Allen et al. ............. 220/592.16 |
| 5,529,204 A | | 6/1996 | Sykes |
| 5,573,141 A | | 11/1996 | Chen |
| 5,597,086 A | | 1/1997 | King-Shui |
| 5,727,709 A | | 3/1998 | Nobile |
| D411,716 S | | 6/1999 | Besser et al. |
| 5,918,761 A | * | 7/1999 | Wissinger .................... 220/713 |
| D418,374 S | | 1/2000 | McNamee et al. |
| 6,105,799 A | | 8/2000 | Takagawa |

FOREIGN PATENT DOCUMENTS

| | | |
|---|---|---|
| GB | 2 033 573 A | 3/1980 |
| GB | 2 039 214 A | 8/1980 |

* cited by examiner

*Primary Examiner*—Allan R. Kuhns
(74) *Attorney, Agent, or Firm*—Hunton & Williams LLP

(57) ABSTRACT

A vacuum-insulated container for transporting and dispensing beverages or food products has a stainless steel vacuum-insulated liner surrounded by a body. The body includes several cylindrical sections attached together. Expanding foam is sprayed between the liner and the body, and the expanded foam helps to prevent the cylindrical sections from detaching. A weight is placed between the body and the liner for adjusting a center of mass of the container. The center of mass is adjusted to be spaced radially away from a central longitudinal axis of the container, below a mid-plane of the container, and 180° away from a handle around the central longitudinal axis. Thus, if the container falls into water or tips on its side, it will come to rest in a position with the handle standing substantially upright. The handle can fold flush with the container and can extend away from the container for grasping. A locking means is provided to releasably lock the handle in the extended position.

10 Claims, 6 Drawing Sheets

METHOD OF ASSEMBLING A CONTAINER WITH EXPANDING FOAM

This application is a divisional of U.S. patent application Ser. No. 09/758,227, filed Jan. 12, 2001, now U.S. Pat. No. 6,530,496, issued Mar. 11, 2003.

BACKGROUND OF THE INVENTION

1. Field of the Invention

The field of the invention is portable beverage and food containers, and more particularly portable beverage and food containers with vacuum-insulated liners.

2. Description of Related Art

Various designs for portable beverage and food containers, including vacuum-insulated portable beverage and food containers, are known in the art. None have the advantageous features of the container of this invention. More specifically, the prior art containers do not include a container that will float in a position with the handle standing substantially upright out of the water with the container tilted toward its top. The prior art containers also do not have the same advantageous attaching means as this invention for attaching sections of the body one to another, using expanding foam to prevent the sections from detaching. The prior art containers also do not have a handle advantageously extendable away from the body with a mechanism for releasably locking the handle away from the body.

SUMMARY OF THE INVENTION

According to one aspect of the invention, a container has a liner with an interior cavity for holding a beverage or a food product and a body comprised of a first substantially cylindrical section and a second substantially cylindrical section attached together. The body substantially surrounds the liner with a substantially cylindrical space between the body and the liner. Attaching means for attaching the first substantially cylindrical section to the second substantially cylindrical section by axially aligning the first substantially cylindrical section and the second substantially cylindrical section, pushing the first substantially cylindrical section axially towards the second substantially cylindrical section, and not permitting detachment of the first substantially cylindrical section from the second substantially cylindrical section unless a portion of one of the first substantially cylindrical section or the second substantially cylindrical section is flexed radially-inwards. Expanded foam fills the substantially cylindrical space between the liner and the body such that the expanded foam resists radially-inward flexing of the first substantially cylindrical section or the second substantially cylindrical section to prevent the first substantially cylindrical section and the second substantially cylindrical section from detaching.

According to another aspect of the invention, a container has a body with a central longitudinal axis and an interior cavity substantially enclosed by the body for holding a beverage or a food product. The interior cavity has a first open end at a top of the body for filling and dispensing the beverage or the food product. A handle is attached to the body. The container has a specific gravity of less than 1 and is water tight. The center of mass of the container is 1) radially spaced from a central longitudinal axis, 2) spaced on a side of a mid-plane of the container opposite the first open end, and 3) spaced approximately 180° opposite the handle around the central longitudinal axis.

According to another aspect of the invention, a container has a body with a central longitudinal axis and an interior cavity substantially enclosed by the body for holding a beverage or a food product. The interior cavity has a first open end at a top of the body for filling and dispensing the beverage or the food product and a space between the body and the cavity. A weight is disposed in the space in a position which adjusts the center of mass of the container 1) away from the central longitudinal axis of the body, 2) on the side of the mid-plane of the container opposite the first open end, and 3) approximately 180° opposite the handle around the central longitudinal axis.

According to another aspect of the invention, a container has a body with a central longitudinal axis and an interior cavity substantially enclosed by the body for holding a beverage or a food product. The interior cavity has a first open end for filling and dispensing the beverage or the food product. A first pin and a second pin are supported on the body. A flexible handle has a first end and a second end. The first end of the flexible handle has a hole formed therein, the first pin passes through the hole and attaches the first end to the body. The second end of the flexible handle has a substantially "L"-shaped slot formed therein. The substantially "L"-shaped slot has a first end and a second end, the second pin passes through the substantially "L"-shaped slot for attaching the second end to the body. When the handle is in a position flush with the body, the second pin passes through the substantially "L"-shaped slot near the first end, and when the handle is in a position flexed away from the body, the second pin passes through the substantially "L"-shaped slot near the second end, and the handle in this position is biased in a direction to keep the second pin near the second end.

The accompanying drawings, which are incorporated in and constitute a part of this specification, illustrate embodiments of the invention, and together with the description, serve to explain the principles of the invention.

DETAILED DESCRIPTION OF THE PREFERRED EMBODIMENTS

Figure 1:
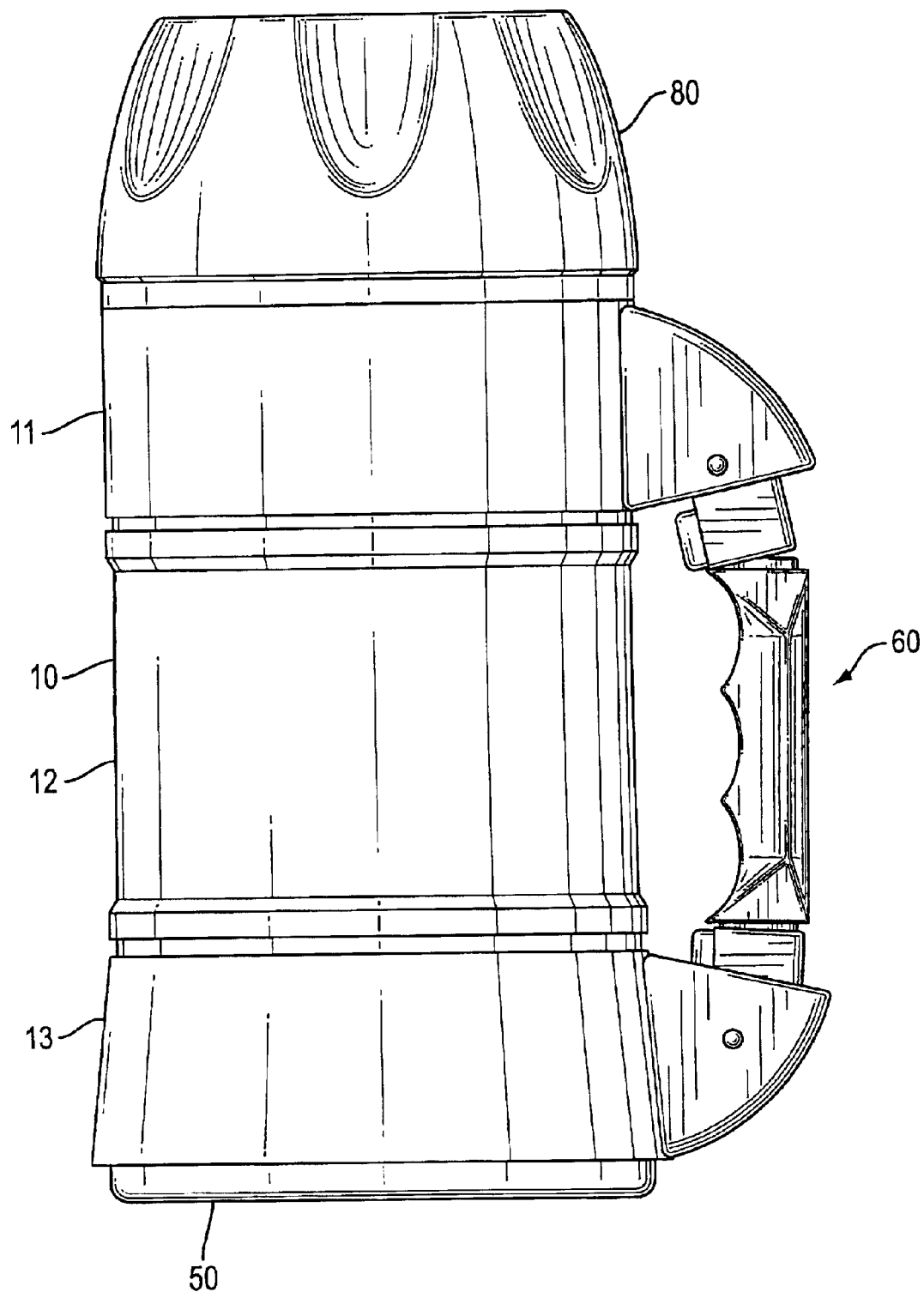
FIG. 1 is a side elevational view of a container according to the present invention.

Reference will now be made in detail to the preferred embodiments of the invention, examples of which are illustrated in the accompanying drawings in which like reference characters refer to corresponding elements.

Figure 2:
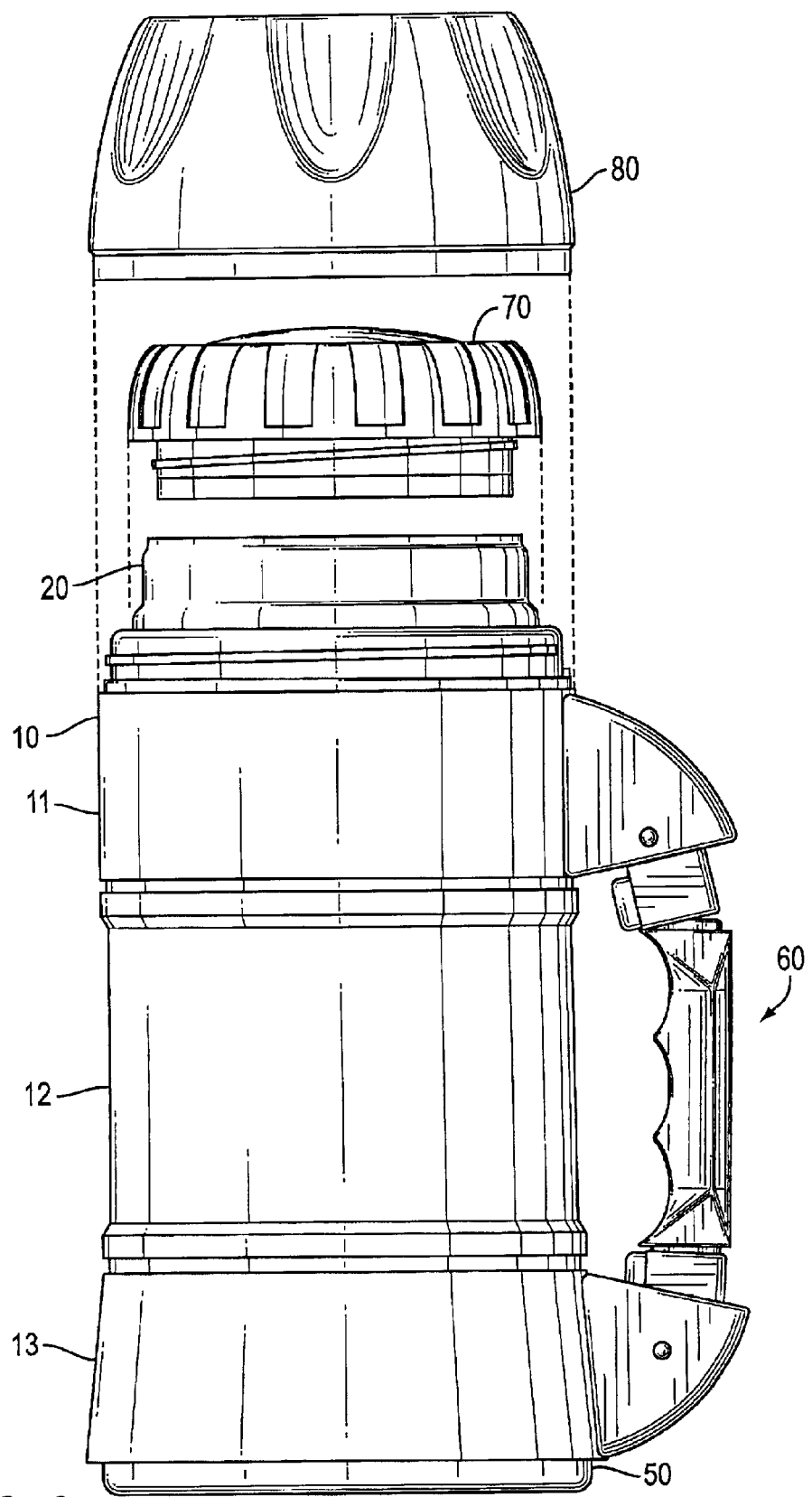
FIG. 2 is a side elevational view of the container of FIG. 1 with the lid and stopper removed.
Figure 3:
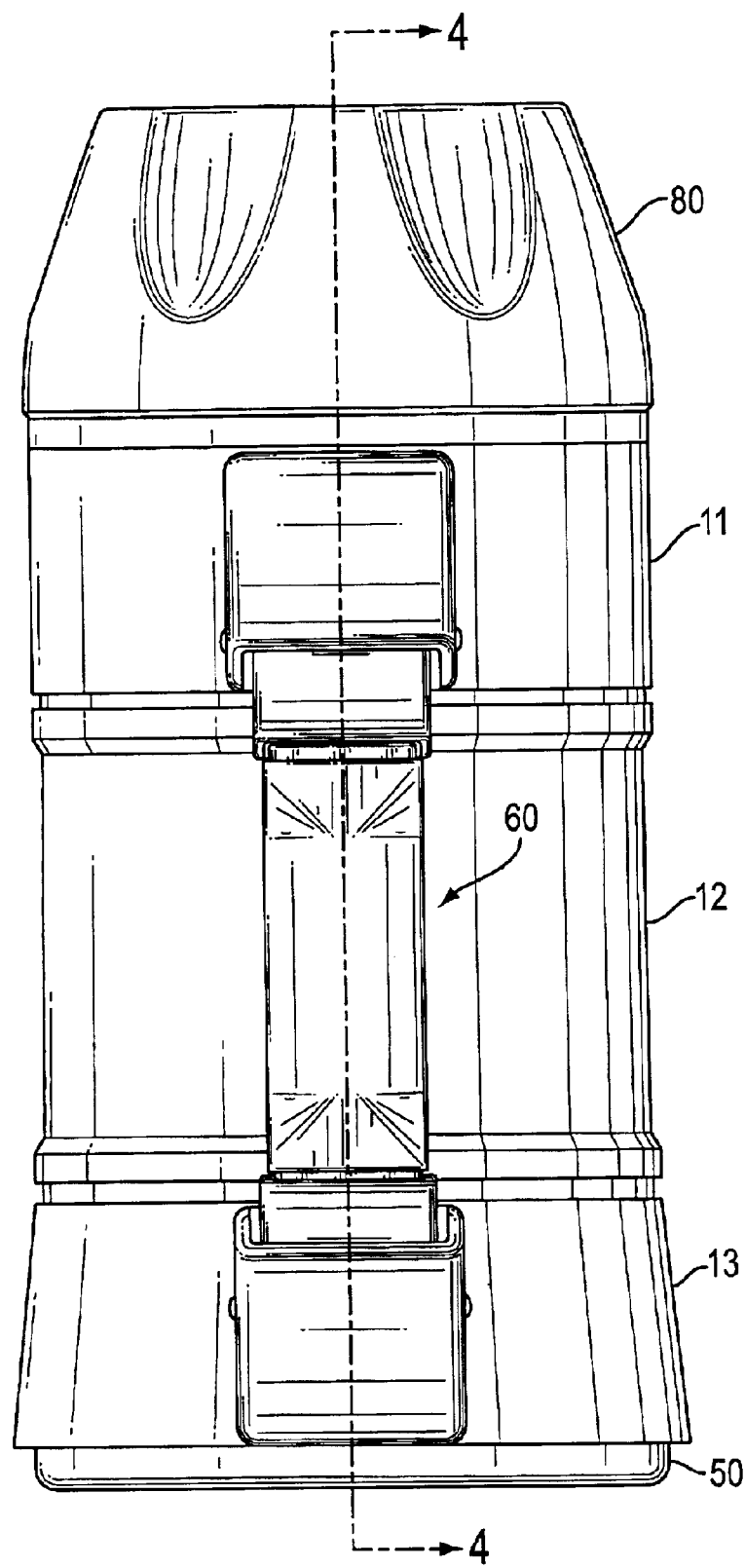
FIG. 3 is a front elevational view of the container of FIG. 1.
Figure 4:
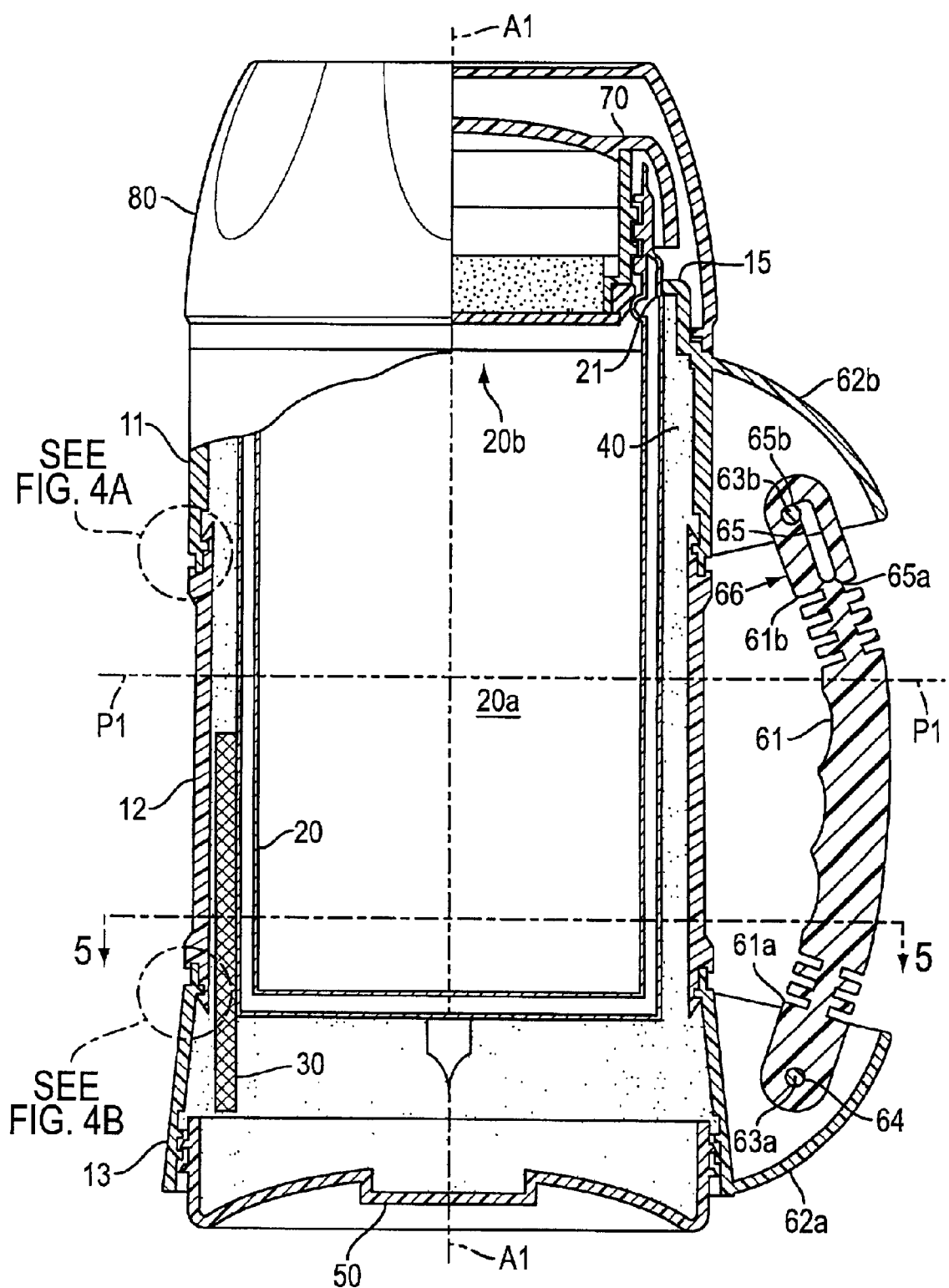
FIG. 4 is a schematic partial sectional view of a container according to the present invention taken from cutting line 4—4 in FIG. 3.

As shown in FIGS. 2–4, a container 100 of a preferred embodiment includes a body 10, a liner 20, a weight 30, expanded foam 40, a base 50, a handle 60, a stopper 70, and a lid 80.

The liner 20 includes a cavity 20a for holding a beverage or a food product and an open end 20b for filling and dispensing the beverage or the food product. In a preferred embodiment, the liner 20 is stainless steel and is vacuum-insulated against heat loss in a manner well known in the art. The liner 20 is substantially enclosed by the body 10. The body 10 fits tightly against the liner 20 near the open end 20b of the liner 20. A groove 21 is formed around an exterior of the liner 20 and a lip 15 of the body 10 seals against the groove 21. The stopper 70 attaches to the liner 20 in any of several known manners, such as by complementary screw threads, to seal the cavity 20a for transporting the beverage or the food product. A lid 80 attaches to the body 10 in any of several known manners, such as complementary threads, and covers the stopper 70. The lid 80, when removed from the body 10, may also function as a drinking cup. The handle 60 is attached to a side of the body 10 for carrying. The base 50 attaches to the body 10 in any of several known manners, including complementary screw threads.

In the preferred embodiment, the body 10 includes three separate sections: a top section 11, a middle section 12, and a bottom section 13. However, the body 10 could also be one single unitary piece, two separate sections, or three or more separate sections. The top section 11, the middle section 12, and the bottom section 13 are each substantially cylindrical, thin-walled plastic components, each separately formed in an injection molding process. Because each of the sections 11, 12 and 13 is formed in a separate injection molding process, the profile of the body 10 can include configurations that would not be possible if the body 10 were formed in a single injection molding process. Each of the sections 11, 12 and 13 has a side wall and two open ends.

One open end of the top section 11 and the bottom section 13, and both open ends of the middle section 12, have an attaching means 14 for attaching the sections 11, 12 and/or 13 to one another. The attaching means 14 attaches one of the sections 11, 12 or 13 to another of the sections 11, 12 or 13 by simply aligning the attaching means 14 of the open ends of each section 11, 12 or 13 and pushing one section 11, 12 or 13 axially towards another section 11, 12 or 13. The attaching means 14 does not permit detachment of the sections 11, 12 or 13 unless a portion of the open end of one of the sections 11, 12 or 13 is flexed radially-inwards.

Figure 4A:
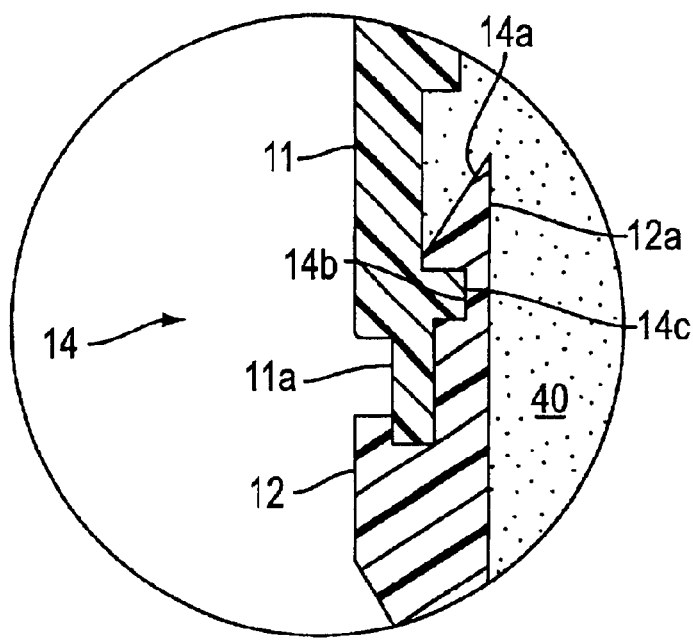
FIGS. 4A and 4B are detail views of the container from FIG. 4.
Figure 4B:
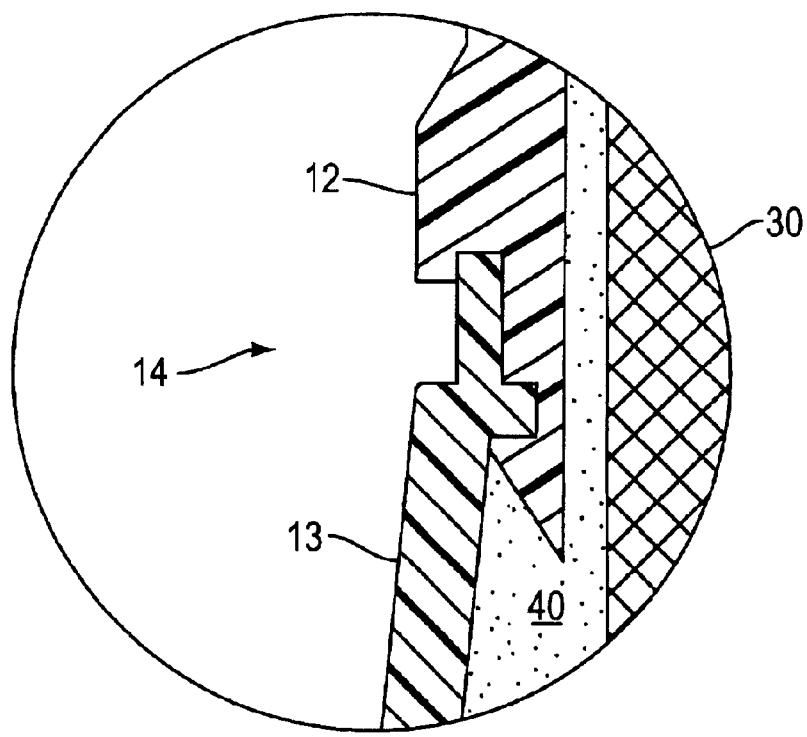

For example, in FIG. 4A, the attaching means 14 includes a camming surface 14a formed on one section 11, 12 or 13 to be attached and a radially-inward projecting locking flange 14b formed on the other section 11, 12 or 13. When the middle section 12 is pushed axially towards the top section 11, the camming surface 14a formed on the open end 12a of the middle section 12 engages the locking flange 14b formed on the open end 11a of the top section 11 and causes the open end 12a to flex radially-inward. When the open end 12a is flexed radially-inward, the camming surface 14a can move past the locking flange 14b. Eventually the locking flange 14b will engage with a corresponding radially-inward extending groove 14c formed in the middle section 12 and the open end 12a will snap back to its previous shape and dimensions. The middle section 12 and the top section 11 are thus attached to one another and cannot be detached unless the open end 12a is again flexed radially-inward so that it can pass by the locking flange 14b. When the space between the body 10 and the liner 20 is filled with expanded foam 40, it is very difficult to flex a portion of the open end 12a radially inward because the expanded foam 40 is resistant to compression and prevents the open end 12a from flexing radially inward. During the expansion and curing of the expanded foam 40, hoop stress may be induced in the body sections 11, 12 and 13. If the foam 40 cures or hardens while this stress remains in body sections 11, 12 and 13, the stress will act to even more tightly attach the sections 11, 12 and 13 to one another. FIG. 4B provides another example of the attaching means 14 attaching the middle section 12 and the bottom section 13.

In a preferred embodiment, the container 100 is assembled by attaching the top section 11, the middle section 12, and the bottom section 13 to one another through the attaching means 14 to form the body 10. The liner 20 is inserted into the body 10 such that a hollow space remains between the liner 20 and the body 10. A conventional foaming plastic known in the art is sprayed into a hollow space between the liner 20 and the body 10. The base 50 is attached to the body 10. The base 50 closes the hollow space between the body 10 and the liner 20 and forces the foam 40 to fill the hollow space. The foam 40 is allowed to expand and cure. A small hole formed in the base 50 permits gases and excess foam 40 to escape during the expansion and curing of the foam 40. The small hole is later sealed. When the expanded foam 40 has cured, the body 10, the liner 20, and the base 50 are all locked stationary to one another.

In a preferred embodiment, the body 10, the lid 80, and the base 50 are each constructed of ABS plastic. Since the container 100 is already substantially surrounded by the shock absorbing expanded foam 40, the tough ABS plastic makes the container 100 even more durable.

As shown in FIG. 4, the body 10 and the liner 20 are proportioned so that enough of the expanded foam 40 is disposed inside of the container 100 to make the specific gravity of the container 100 less than 1. The container 100 will thus advantageously float if, for example, it is accidentally dropped into water. The container 100 will float even if it is filled with the beverage or the food product and the stopper 70 and the lid 80 are attached (unless, of course, the beverage or the food product is significantly more dense than the liquid in which the container 100 is floating). The joints between the various body sections 11, 12, and 13 and between the body 10 and the base 50 are substantially water-tight. The expanded foam 40 also helps the container 100 to remain water tight. Thus, if the container 100 is floating on top of water, water will not be able to penetrate into the container 100 and reduce its specific gravity.

Figure 5:
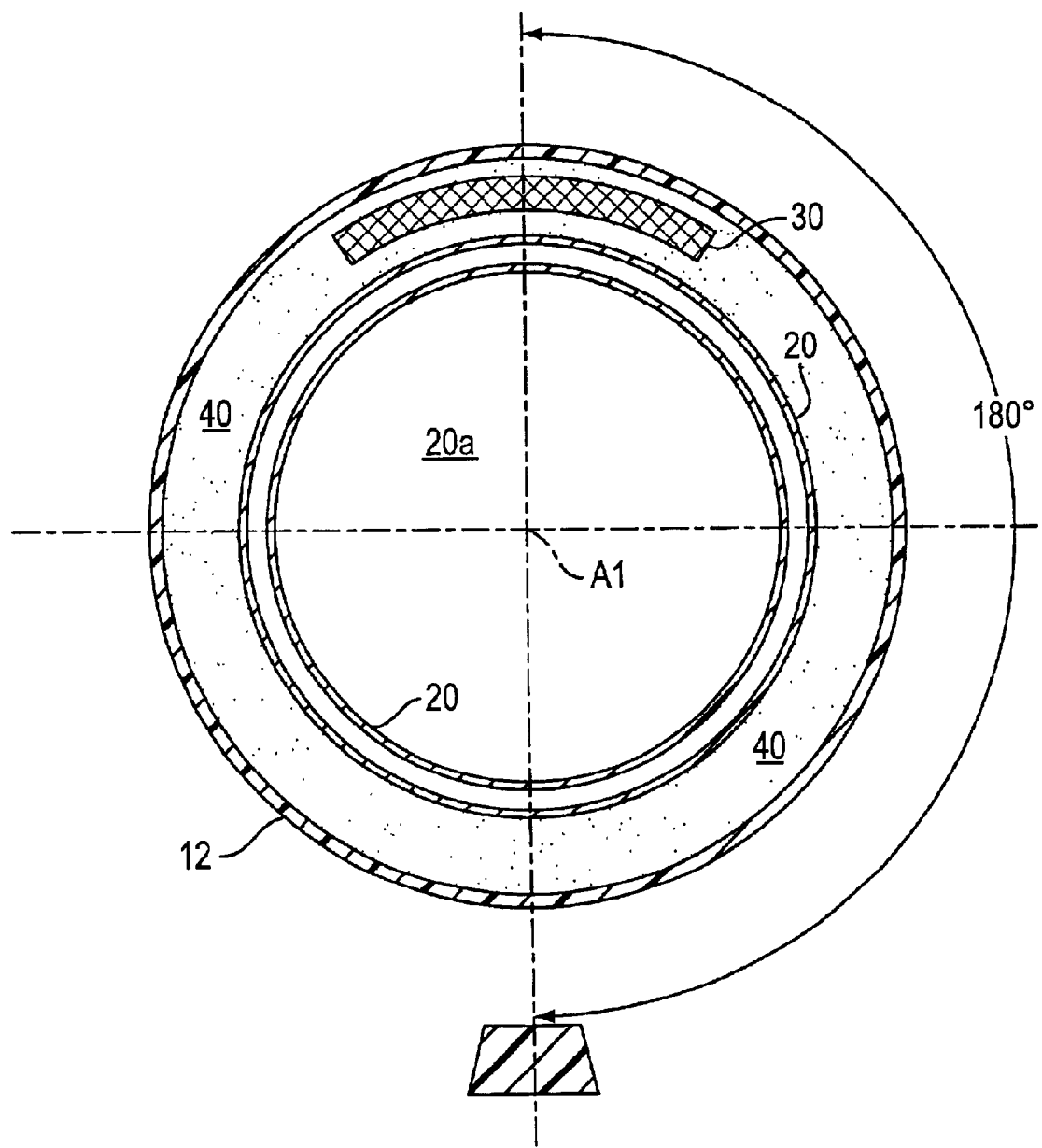
FIG. 5 is a sectional view of the container taken from cutting lines 5—5 in FIG. 4

With reference to FIGS. 4 and 5, a weight 30 is disposed between the liner 20 and the body 10. The weight 30 affects the location of the center of mass of the container 100. The weight 30 is positioned so that the center of mass of the container 100 is spaced radially away from the central axis A1 and approximately 180° around the central axis A1 from the handle 60. The weight 30 is also positioned so that the center of mass of the container 100 lies below the mid-plane P1 of the container 100. The mid-plane P1 is defined as the plane perpendicular to the central axis A1 and lying an equal distance from the top and bottom of the container 100, as illustrated in FIG. 4. With the center of mass of the container 100 so adjusted, the container 100 will float on water in an orientation so that the handle 60 will stand substantially upright out of the water with the lid 80 projecting part way out of the water and the base 50 more submerged. When resting on its side, the container 100 will also roll and eventually come to rest in an orientation with the handle 60 standing substantially straight up. Thus, if the container 100 is accidentally dropped in water or on its side on a flat surface, it will eventually come to rest in an orientation with the handle 60 substantially straight upright (away from the water or surface) for easy grasping and retrieval. Whether the lid 80 and the stopper 70 are attached to the container 100 makes little difference in the location of the center of mass with this construction. Thus the container 100 will assume the same orientation in water or on its side whether or not the lid 80 and the stopper 70 are attached.

Furthermore, the container 100 will assume the same orientation in water or on its side even when the cavity 20a is filled with the beverage or the food product.

In a preferred embodiment, the weight 30 can be conveniently constructed by bending a planar rectangle of inexpensive sheet metal with a radius approximating the radius of the exterior of the liner 20 or the body 10. The weight 30 is positioned inside the container 100 between the body 10 and the liner 20 with at least a majority of the weight 30 below the mid-plane P1. As previously described, the weight 30 is effectively supported inside the container 100 and is held stationary relative to the body 10 and the liner 20 by the expanded foam 40, without the use of any fastening means.

Referring now to FIG. 4, the unique handle assembly of the present invention is comprised of the handle 60 which includes a flexible finger grip 61, which can fold flush to the body 10 or can extend away from the body 10 to facilitate grasping. The handle 60 includes two projections 62a, 62b attached to the body 10 and extending away from the body 10. Each of the projections 62a, 62b supports a pin 63a, 63b. The pins 63a, 63b are aligned approximately perpendicular to the central longitudinal axis A1 of the body 10. The pin 63a passes through a hole 64 formed in a first end 61a of the finger grip 61 to attach the first end 61a to the body 10. An "L"-shaped slot 65 is formed in a second end 61b of the finger grip 61. The "L"-shaped slot 65 has a first end 65a and a second end 65b. The pin 63b passes through the "L"-shaped slot 65 to attach the second end 61b to the body 10. When the finger grip 61 is positioned flush against the body 10, the pin 63b lies in the slot 65 near the first end 65a. When the finger grip 61 is flexed away from the body 10, as in FIG. 4, the pin 63b slides in the slot 65 from the first end 65a to the second end 65b. When the finger grip 61 is flexed away from the body 10, the second end 61b is biased in the direction of an arrow 66. Therefore, the pin 63b tends to remain in the end 65b of the slot 65 and prevents the finger grip 61 from returning to its position flush with the body 10 until the user pushes the end 61b toward the body 10 to remove the pin 63b from the end 65b of the slot 65. The pin 63b can then move along the slot 65 towards the end 65a while the finger grip 61 moves into its position flush with the body 10.

It will be apparent to those skilled in the art that various modifications and variations can be made to the apparatuses of the present invention without departing from the scope or spirit of the invention. Thus, it is intended that the present invention cover the modifications and variations of this invention provided they come within the scope of the appended claims and their equivalents.

I claim:

1. A method of making a container comprising a body, a liner with a cavity for holding a beverage or a food product and a first open end for dispensing the beverage or the food product, and a weight, the method comprising:

a. inserting the liner inside of the body creating a hollow space between the liner and the body;

b. placing the weight in the hollow space;

c. injecting an expandable foam in the hollow space; and d. allowing the foam to expand and cure, the foam holding the weight stationary relative to the body and the liner.

2. The method of claim 1 further comprising:

sealing an open end of the body with an end cap before the foam completely expands, the end cap having an orifice for allowing gases and excess foam to escape.

3. The method of claim 2 further comprising sealing the orifice in the end cap.

4. A method of making a container comprising a body, a liner with a cavity for holding a beverage or a food product and a first open end for dispensing the beverage or the food product, the method comprising:

a. assembling a plurality of independent sections to form the body substantially surrounding the liner by temporarily flexing a portion of a first independent section to move past a projection on a second independent section, the portion returning to at least a partially unflexed position after moving past the projection, a hollow space being formed between the body and the liner;

b. injecting an expandable foam in the hollow space; and c. allowing the foam to expand and cure, the expanded foam assisting in preventing the portion from being flexed to move past the projection, expanded foam thereby assisting in preventing the first independent section from detaching from the second independent section.

5. The method of claim 4 further comprising:

sealing an open end of the body with an end cap before the foam completely expands, the end cap having an orifice for allowing gases and excess foam to escape.

6. The method of claim 5 further comprising sealing the orifice in the end cap.

7. The method of claim 4 wherein:

during the assembling of the plurality of independent sections to form the body, the portion of the first independent section must flex radially inward; and the expanded foam's resistance to compression assists in preventing radial inward flexing of the portion.

8. The method of claim 7 further comprising:

sealing an open end of the body with an end cap before the foam completely expands, the end cap having an orifice for allowing gases and excess foam to escape.

9. The method of claim 8 further comprising sealing the orifice in the end cap.

10. The method of claim 4 further comprising positioning a weight in the hollow space before the expandable foam is injected in the hollow space, the expanding foam holding the weight in position relative to the body and the liner.

\* \* \* \* \*